(12) United States Patent
Schmidt et al.

(10) Patent No.: US 10,558,255 B2
(45) Date of Patent: Feb. 11, 2020

(54) HYBRID HARDWARE/FIRMWARE POWER MANAGEMENT CONTROLLER FOR MEDIA DEVICES

(71) Applicants: Jonathan E. Schmidt, Richmond (CA); Joerg Hartung, Vancouver (CA); Steffen Kosinski, Braunschweig (DE); Jack Cummings, Vancouver (CA)

(72) Inventors: Jonathan E. Schmidt, Richmond (CA); Joerg Hartung, Vancouver (CA); Steffen Kosinski, Braunschweig (DE); Jack Cummings, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 423 days.

(21) Appl. No.: 15/396,007

(22) Filed: Dec. 30, 2016

(65) Prior Publication Data
US 2018/0188798 A1 Jul. 5, 2018

(51) Int. Cl.
G06F 13/32 (2006.01)
G06F 1/3287 (2019.01)
G06F 13/24 (2006.01)
G06F 1/30 (2006.01)

(52) U.S. Cl.
CPC ............ *G06F 1/3287* (2013.01); *G06F 1/305* (2013.01); *G06F 13/24* (2013.01)

(58) Field of Classification Search
None
See application file for complete search history.

(56) References Cited

U.S. PATENT DOCUMENTS 5,758,171 A * 5/1998 Ramamurthy ............ G06F 1/26
713/300
7,949,817 B1 * 5/2011 Sakarda ................ G06F 1/3203
710/307

OTHER PUBLICATIONS

Wekipidia.com, Processor register, Jun. 2004, p. 1 (Year: 2004).*

* cited by examiner

*Primary Examiner* — Henry Tsai
*Assistant Examiner* — Dean Phan
(74) *Attorney, Agent, or Firm* — Jordan IP Law, LLC (57) ABSTRACT

Systems, apparatuses and methods may provide for firmware access wrapper technology that includes a plurality of input registers communicatively coupled to a hardware power controller, a plurality of output registers communicatively coupled to the hardware power controller, and a processor communicatively coupled to the input registers and the output registers. The processor may include configurable logic to identify a control policy change with respect to the hardware power controller, detect input signal information in one or more of the input registers, and conduct a modification of one or more values in the output registers based on the control policy change and the input signal information.

24 Claims, 3 Drawing Sheets

HYBRID HARDWARE/FIRMWARE POWER MANAGEMENT CONTROLLER FOR MEDIA DEVICES

TECHNICAL FIELD

Embodiments generally relate to memory structures.

BACKGROUND

Integrated circuit (IC) based non-volatile memory (NVM) may be used as media in solid state drive (SSD) technology in order to persistently store data. Power modes of the SSD may be controlled by an application specific IC (ASIC, e.g., hardware power controller) that provides relatively low power operation and short wakeup latencies. Environmental changes, however, such as new media requirements during final development stages and/or noise-related design errors, may lead to additional semiconductor manufacturing runs (e.g., "spins") of the hardware power controller in order to render the SSD ready for deployment. Conventional solutions may therefore be operationally inflexible and/or associated with suboptimal product launch times.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
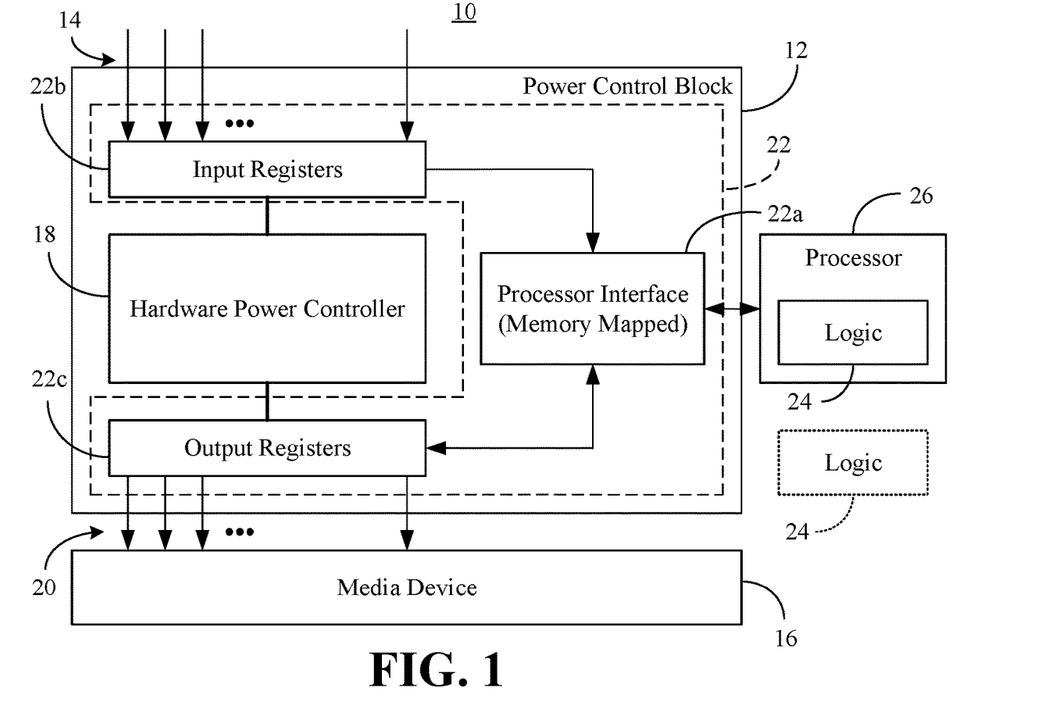
FIG. 1 is a block diagram of an example of a system including a power control block according to an embodiment.

Turning now to FIG. 1, a storage system 10 is shown in which a power control block 12 monitors one or more input signals 14 that are relevant to the power management of a media device 16. The media device 16 may include, for example, integrated circuit (IC) based non-volatile memory (NVM). In such a case, the storage system 10 might be a solid state drive (SSD). Thus, the plurality of input signals 14 might include idle signals, clock requests and/or other transient signals that may be relevant to whether the media device 16 should be placed in or removed from one or more power states/modes. The transient nature of the input signals 14 (e.g., pulses set for only one clock cycle) may call for the use of a hardware power controller 18 (e.g., application specific integrated circuit/ASIC, complementary metal oxide semiconductor/CMOS, transistor-transistor logic/ TTL, and/or other fixed functionality technology) that facilitates relatively low power operation and short wakeup latencies.

The power control block 12 may also generate one or more output signals 20 that control the power states of the media device 16. More particularly, the hardware power controller 18 may be configured to generate the output signals 20 according to a certain control policy. Environmental changes, however, such as new media requirements during final development stages and/or noise-related design errors, may call for changes in the control policy after fabrication of the hardware power controller 18. Accordingly, the illustrated system 10 may include a firmware access wrapper 22 (22a-22c, e.g., logic) and logic 24 that enables a processor 26 (e.g., host processor, central processing unit/CPU) to selectively override the control policy implemented by the hardware power controller 18. Such an approach may in turn enable the power control block 12 to achieve greater flexibility while still realizing the low power and short latency benefits provided by the hardware power controller 18. Thus, the firmware access wrapper 22 and the processor 26 may be considered a power management override apparatus that improves the operation of the system 10. Indeed, the illustrated solution may lead to fewer ASIC spins and shorter development time.

In one example, the wrapper 22 includes a memory mapped processor interface 22a, a plurality of input registers 22b communicatively coupled to the hardware power controller 18 and a plurality of output registers 22c communicatively coupled to the hardware power controller 18. The input registers 22b may generally be read only (RO) from the perspective of the processor interface 22a and the processor 26, whereas the output registers 22c may be read write (RW) from the perspective of the processor interface 22a and the processor 26. As will be discussed in greater detail, the logic 24 (e.g., logic instructions, configurable logic) may identify a control policy change (e.g., pursuant to an environmental change) with respect to the hardware power controller 18, detect input signal information in one or more of the input registers 22b and conduct a modification of one or more values in the output registers 22d based on the control policy change and the input signal information.

For example, the hardware power controller 18 may be permanently configured to place the media device 16 in a relatively deep low power state in response to a certain clock stop request in the input signals 14. Accordingly, the hardware power controller 18 may place an appropriate value in one or more of the output registers 22c that would otherwise trigger a transition of the media device 16 into the relatively deep low power state. Subsequent to the manufacture of the hardware power controller 18, however, the media device 16 may be changed to a different type of media that does not support the relatively deep low power state (or supports an even deeper low power state). In such a case, the logic 24 may change, via the memory mapped processor interface 22a, the value in the output register(s) 22c from the hardware power controller 18 to another value that triggers a transition of the media device 16 into a different (e.g., shallower or deeper) low power state that is supported by the new type of media. Of particular note is that the logic 24 may be updated (e.g., via firmware update) as environmental conditions change without involving an additional semiconductor manufacturing run with respect to the hardware power controller 18. Thus, a hybrid hardware/firmware power management solution may be obtained. The logic 24 may reside on the processor 26 (e.g., as configurable logic), elsewhere in the system 10 (e.g., as logic instructions retrieved from a non-transitory computer readable storage medium and executed on a processor core), etc., or any combination thereof.

Figure 2:
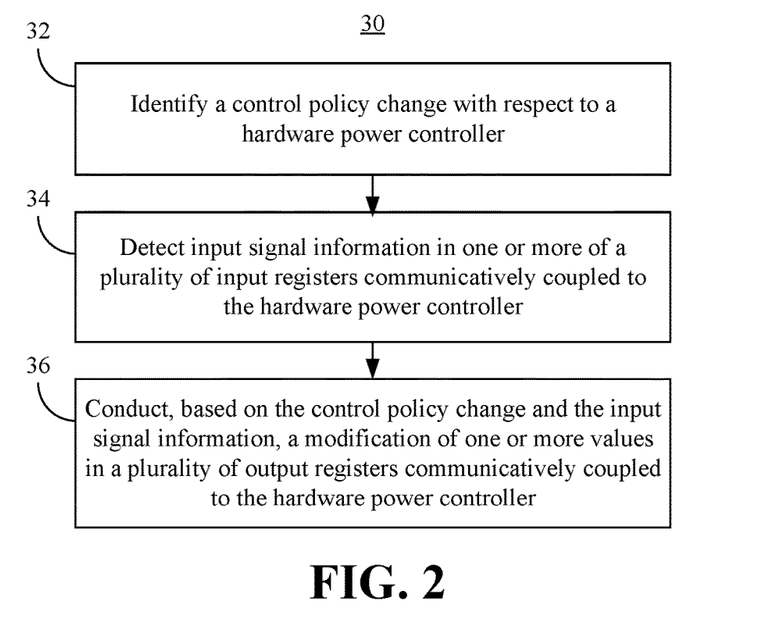
FIG. 2 is a flowchart of an example of a method of operating a power management override apparatus according to an embodiment.

FIG. 2 shows a method 30 of operating a power management override apparatus. The method 30 may generally be implemented in logic such as, for example, the logic 24 (FIG. 1), already discussed. More particularly, the method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 may provide for identifying a control policy change with respect to a hardware power controller (e.g., ASIC, CMOS, TTL technology). Additionally, input signal information may be detected at block 34 in one or more of a plurality of input registers communicatively coupled to the hardware power controller. Illustrated block 36 conducts, based on the control policy change and the input signal information, a modification of one or more values in a plurality of output registers communicatively coupled to the hardware power controller. The result of block 36 may be a power state change in the media device 16.

Figure 3:
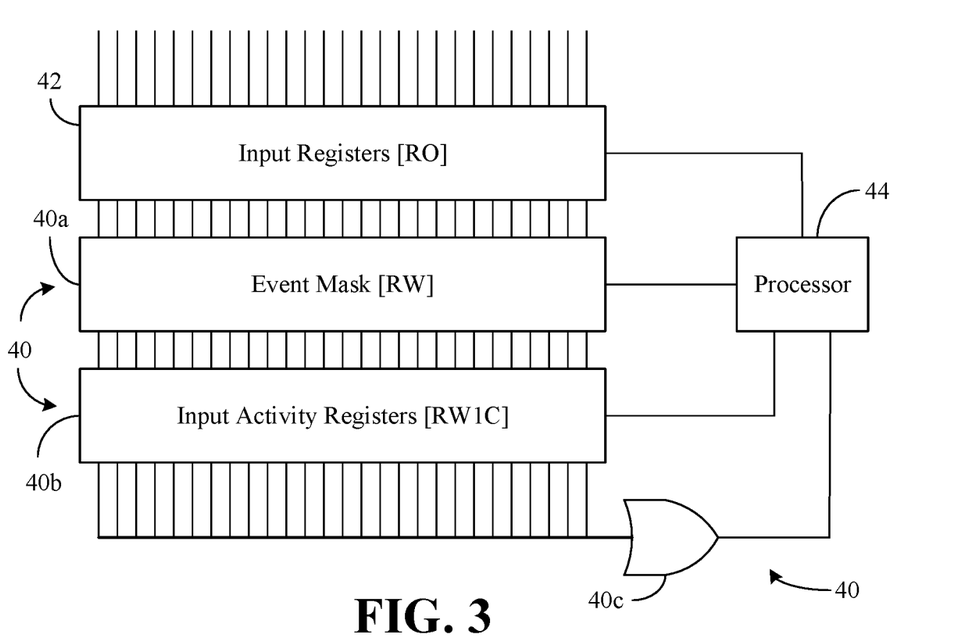
FIG. 3 is a schematic diagram of an example of a register architecture that includes an event mask according to an embodiment.

FIG. 3 demonstrates that detection of the input signal information may be achieved in a number of different ways. In the illustrated example, an edge detector 40 (40a-40c) includes an event mask 40a, a plurality of input activity registers 40b and a logic gate 40c (e.g., OR reduction). The event mask 40a may be communicatively coupled to a plurality of input registers 42, wherein a processor 44 (e.g., executing logic instructions and/or configurable logic) may set and/or modify one or more trigger conditions in the event mask 40a. The trigger conditions may specify an event (e.g., rising edge, falling edge, rising and falling edge, no change) with respect to each of a plurality of input signals that will cause the event mask 40a to set a corresponding bit in the input activity registers 40b. The processor 44 may also modify the trigger condition(s) in response to, for example, a power state change in a media device associated with the hardware power controller. Thus, the trigger conditions may be power state dependent.

The input activity registers 40b may be considered "sticky" (i.e., exhibit read write one clear/RW1C bitwise behavior) to the extent that each bit stays set in the input activity registers 40b until the processor 44 clears the bit via a write operation (e.g., writes a value of one to the corresponding register). In the illustrated example, all bits in the input activity registers 40b are combined through an OR reduction in which the logic gate 40c generates an interrupt in response to at least one of the trigger condition(s). In such a case, the modification of the output register values may be conducted in response to the interrupt.

Figure 4:
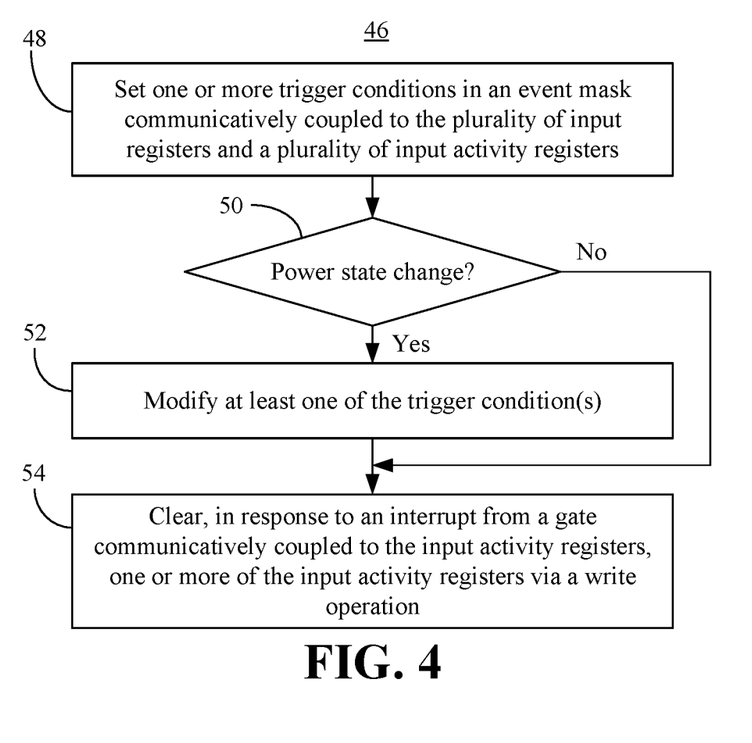
FIG. 4 is a flowchart of an example of a method of detecting input signal information according to an embodiment.

FIG. 4 shows a method 46 of detecting input signal information. The method 46, which may generally be implemented in the logic 24 (FIG. 1) and/or the edge detector 40 (FIG. 3), may be readily substituted for block 34 (FIG. 2), already discussed. More particularly, the method 46 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, or any combination thereof.

Illustrated processing block 48 provides for setting one or more trigger conditions in an event mask communicatively coupled to a plurality of input registers and a plurality of input activity registers. As already noted, the modification of the output register values may be conducted in response to an interrupt from a logic gate communicatively coupled to the input activity registers. Additionally, a determination may be made at block 50 as to whether a power state change has taken place in a media device associated with the hardware power controller. If so, illustrated block 52 modifies at least one of the one or more trigger conditions. Block 54 may clear, in response to the interrupt from the logic gate communicatively coupled to the input activity registers, one or more of the input activity registers via a write operation.

Figure 5:
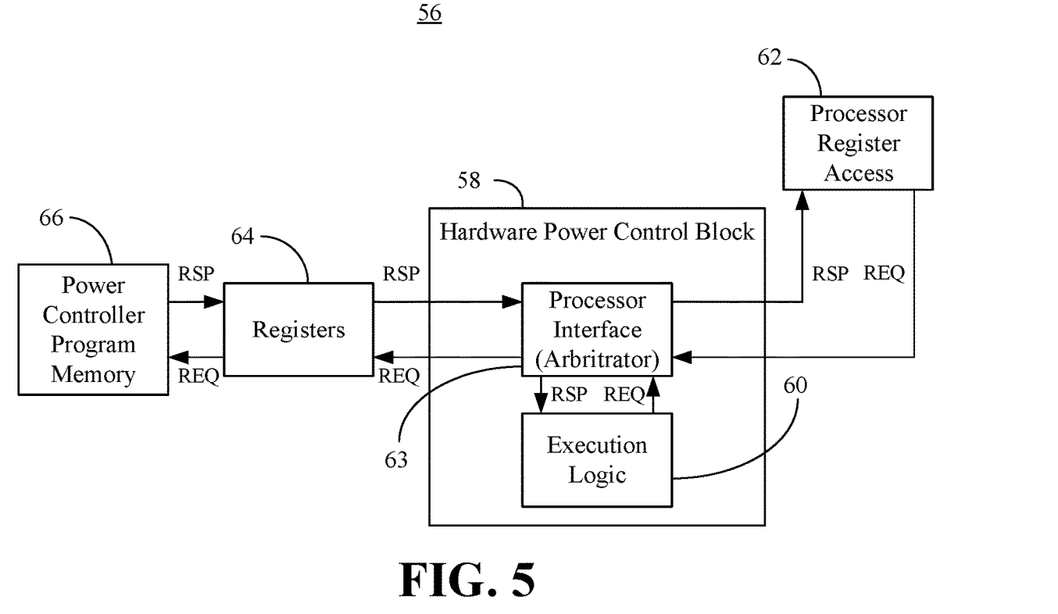
FIG. 5 is a block diagram of an example of a system including a power control block according to an alternative embodiment.

FIG. 5 shows a storage system 56 that includes a hardware power control block 58 having execution logic 60 and a processor interface 63 that functions as an arbitrator. In the illustrated example, both the execution logic 60 and register access logic 62 executing on a processor may issue requests ("REQ") to read from and/or write to a set of registers 64. The registers 64, which may include input registers, output registers and/or input activity registers as described herein, may represent a communications interface to a power controller program memory 66 that is used to control the power states of a media device. Thus, the requests from the register access logic 62 may include attempts to set and/or update an event mask, clear input activity register(s), read from the input registers and/or write to the output registers. Similarly, the requests from the execution logic 60 might include attempts to read from the input registers and/or write to the output registers. Thus, the processor interface 63 may arbitrate between the incoming requests and provide responses ("RSP") as appropriate, wherein the responses may include data retrieved from the registers 64, write acknowledgements, and so forth.

The illustrated solution may reduce the amount of wiring involved by using the processor interface 63 to handle signals that can tolerate an additional cycle of arbitration latency. The impact of the arbitration may be minimal due to the relatively low number of accesses expected from the register access logic 62. Meanwhile, the illustrated solution may consolidate hundreds of wires down to a single n-bit (e.g., 32-bit) register bus. Such an approach may be useful for low power architectures in which the hardware power control block 58 is "always-on."

Figure 6:
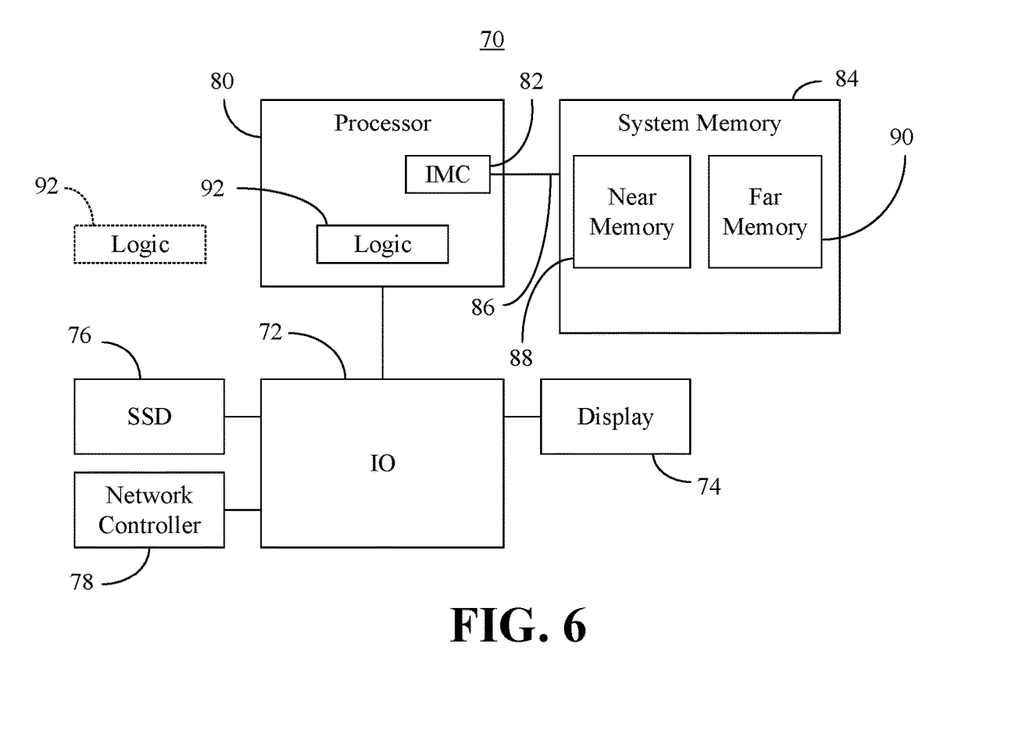
FIG. 6 is a block diagram of an example of a computing system according to an embodiment.

Turning now to FIG. 6, a memory-based computing system 70 is shown. The system 70 may generally be part of a server, desktop computer, notebook computer, tablet computer, convertible tablet, smart television (TV), personal digital assistant (PDA), mobile Internet device (MID), smart phone, wearable device, media player, etc., or any combination thereof. In the illustrated example, an input/output (IO) module 72 is communicatively coupled to a display 74

(e.g., liquid crystal display/LCD, light emitting diode/LED display, touch screen), an SSD 76 and a network controller 78 (e.g., wired, wireless). The illustrated system 70 may also include a processor 80 (e.g., host processor, CPU) that includes an integrated memory controller (IMC) 82 that communicates with a system memory 84 over a bus 86 or other suitable communication interface. The processor 80 and the IO module 72 may be integrated onto a shared semiconductor die (not shown) in a system on chip (SoC) architecture. In one example, the SoC components communicate via a bus architecture such as an Advance Microcontroller Bus Architecture (AMBA, ARM, Ltd.).

In one example, the SSD 76 includes non-volatile memory and the system memory 84 includes near memory 88 and far memory 90 in a two level memory/2LM architecture. The near memory 88 and the far memory 90 may include either volatile memory or non-volatile memory. Non-volatile memory is a storage medium that does not require power to maintain the state of data stored by the medium. Non-limiting examples of non-volatile memory may include any or a combination of: solid state memory (such as planar or 3D NAND flash memory or NOR flash memory), 3D crosspoint memory, storage devices that use chalcogenide phase change material (e.g., chalcogenide glass), byte addressable non-volatile memory devices, ferroelectric memory, silicon-oxide-nitride-oxide-silicon (SO-NOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistorless stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

A memory device can also include a byte-addressable three dimensional crosspoint memory device, or other byte addressable write-in-place nonvolatile memory devices, such as single or multi-level Phase Change Memory (PCM), memory devices that use chalcogenide phase change material (e.g., chalcogenide glass), resistive memory, nanowire memory, ferroelectric transistor random access memory (FeTRAIVI), magnetoresistive random access memory (MRAM) memory that incorporates memristor technology, or spin transfer torque (STT)-MRAM.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

The SSD 76 may include non-volatile memory (NVM), a hardware power controller such as, for example, the hardware power controller 18 (FIG. 1) and a firmware access wrapper such as, for example, the firmware access wrapper 22 (FIG. 1), already discussed. The firmware access wrapper may include a plurality of input registers communicatively coupled to the hardware power controller and a plurality of output registers communicatively coupled to the hardware power controller. Moreover, the processor 80 may include and/or execute logic 92 such as, for example, the logic 24 (FIG. 1), already discussed. The logic 92 may therefore implement one or more aspects of the method 30 (FIG. 2) and/or the method 46 (FIG. 4), already discussed. Thus, the logic 92 may be configured to identify a control policy change with respect to the hardware power controller within the SSD 76, detect input signal information in one or more of the plurality of input registers and conduct a modification of one or more values in the plurality of output registers based on the control policy change and the input signal information. The modification may be conducted via a memory mapped processor interface positioned within the firmware access wrapper, an arbitrator positioned within hardware power controller, and so forth.

Additional Notes and Examples

Example 1 may include a storage system comprising a media device, a hardware power controller, a plurality of input registers communicatively coupled to the hardware power controller, a plurality of output registers communicatively coupled to the hardware power controller and the media device, and a processor communicatively coupled to the plurality of input registers and the plurality of output registers, the processor including configurable logic to identify a control policy change with respect to the hardware power controller, detect input signal information in one or more of the plurality of input registers, and conduct a modification of one or more values in the plurality of output registers based on the control policy change and the input signal information.

Example 2 may include the system of Example 1, further including an event mask communicatively coupled to the plurality of input registers, wherein the configurable logic is to set one or more trigger conditions in the event mask, a plurality of input activity registers communicatively coupled to the event mask, and a gate communicatively coupled to the plurality of input activity registers and the processor, wherein the gate is to send an interrupt to the processor in response to activation of at least one of the one or more trigger conditions and the modification is to be conducted in response to the interrupt.

Example 3 may include the system of Example 2, wherein the configurable logic is to modify at least one of the one or more trigger conditions in response to a power state change in the media device associated with the hardware power controller.

Example 4 may include the system of Example 2, wherein the configurable logic is to clear, in response to the interrupt, one or more of the input activity registers via a write operation.

Example 5 may include the system of any one of Examples 1 to 4, further including a memory mapped processor interface, wherein the modification is to be conducted via the memory mapped processor interface.

Example 6 may include the system of any one of Examples 1 to 4, further including an arbitrator positioned within the hardware power controller, wherein the modification is to be conducted via the arbitrator.

Example 7 may include a power management override apparatus comprising a plurality of input registers communicatively coupled to a hardware power controller, a plurality of output registers communicatively coupled to the hardware power controller, and a processor communicatively coupled to the plurality of input registers and the plurality of output registers, the processor including configurable logic to identify a control policy change with respect to the hardware power controller, detect input signal information in one or more of the plurality of input registers, and conduct a modification of one or more values in the plurality of output registers based on the control policy change and the input signal information.

Example 8 may include the apparatus of Example 7, further including an event mask communicatively coupled to the plurality of input registers, wherein the configurable logic is to set one or more trigger conditions in the event mask, a plurality of input activity registers communicatively coupled to the event mask, and a gate communicatively coupled to the plurality of input activity registers and the processor, wherein the gate is to send an interrupt to the processor in response to activation of at least one of the one or more trigger conditions and the modification is to be conducted in response to the interrupt.

Example 9 may include the apparatus of Example 8, wherein the configurable logic is to modify at least one of the one or more trigger conditions in response to a power state change in a media device associated with the hardware power controller.

Example 10 may include the apparatus of Example 8, wherein the configurable logic is to clear, in response to the interrupt, one or more of the input activity registers via a write operation.

Example 11 may include the apparatus of any one of Examples 7 to 10, further including a memory mapped processor interface, wherein the modification is to be conducted via the memory mapped processor interface.

Example 12 may include the apparatus of any one of Examples 7 to 10, further including an arbitrator positioned within the hardware power controller, wherein the modification is to be conducted via the arbitrator.

Example 13 may include a method of operating a power management override apparatus, comprising identifying a control policy change with respect to a hardware power controller, detecting input signal information in one or more of a plurality of input registers communicatively coupled to the hardware power controller, and conducting, based on the control policy change and the input signal information, a modification of one or more values in a plurality of output registers communicatively coupled to the hardware power controller.

Example 14 may include the method of Example 13, further including setting one or more trigger conditions in an event mask communicatively coupled to the plurality of input registers and a plurality of input activity registers, wherein the modification is conducted in response to an interrupt from a gate communicatively coupled to the plurality of input activity registers.

Example 15 may include the method of Example 14, further including modifying at least one of the one or more trigger conditions in response to a power state change in a media device associated with the hardware power controller.

Example 16 may include the method of Example 14, further including clearing, in response to the interrupt, one or more of the input activity registers via a write operation.

Example 17 may include the method of any one of Examples 13 to 16, wherein the modification is conducted via a memory mapped processor interface.

Example 18 may include the method of any one of Examples 13 to 16, wherein the modification is conducted via an arbitrator positioned within the hardware power controller.

Example 19 may include at least one computer readable storage medium comprising a set of instructions, which when executed by a computing system, cause the computing system to identify a control policy change with respect to a hardware power controller, detect input signal information in one or more of a plurality of input registers communicatively coupled to the hardware power controller, and conduct, based on the control policy change and the input signal information, a modification of one or more values in a plurality of output registers communicatively coupled to the hardware power controller.

Example 20 may include the at least one computer readable storage medium of Example 19, wherein the instructions, when executed, cause the computing system to set one or more trigger conditions in an event mask communicatively coupled to the plurality of input registers and a plurality of input activity registers, and wherein the modification is to be conducted in response to an interrupt from a gate communicatively coupled to the plurality of input activity registers.

Example 21 may include the at least one computer readable storage medium of Example 20, wherein the instructions, when executed, cause the computing system to modify at least one of the one or more trigger conditions in response to a power state change in a media device associated with the hardware power controller.

Example 22 may include the at least one computer readable storage medium of Example 20, wherein the instructions, when executed, cause the computing system to clear, in response to the interrupt, one or more of the input activity registers via a write operation.

Example 23 may include the at least one computer readable storage medium of any one of Examples 19 to 22, wherein the modification is to be conducted via a memory mapped processor interface.

Example 24 may include the at least one computer readable storage medium of any one of Examples 19 to 22, wherein the modification it to be conducted via an arbitrator positioned within the hardware power controller.

Example 25 may include a power management override apparatus comprising means for identifying a control policy change with respect to a hardware power controller, means for detecting input signal information in one or more of a plurality of input registers communicatively coupled to the hardware power controller, and means for conducting, based on the control policy change and the input signal information, a modification of one or more values in a plurality of output registers communicatively coupled to the hardware power controller.

Example 26 may include the apparatus of Example 25, further including means for setting one or more trigger conditions in an event mask communicatively coupled to the plurality of input registers and a plurality of input activity registers, wherein the modification is to be conducted in response to an interrupt from a gate communicatively coupled to the plurality of input activity registers.

Example 27 may include the apparatus of Example 26, further including means for modifying at least one of the one or more trigger conditions in response to a power state change in a media device associated with the hardware power controller.

Example 28 may include the apparatus of Example 26, further including means for clearing, in response to the interrupt, one or more of the input activity registers via a write operation.

Example 29 may include the apparatus of any one of Examples 25 to 28, wherein the modification is to be conducted via a memory mapped processor interface.

Example 30 may include the apparatus of any one of Examples 25 to 28, wherein the modification is to be conducted via an arbitrator positioned within the hardware power controller.

Technology described herein may therefore enable both firmware and a hardware power controller to have access to specific power controls during power transitions in media devices. Accordingly, the technology may enable the same ASIC to control different media products having different design goals and/or priorities. For example, a first media device might have a design that trades moderate power and latency targets for reduced development time. Such a design may rely entirely on firmware for all power transition protocols. A second media device, however, may have more aggressive power and latency characteristics that leads to reduced firmware accesses to the power controller during power sequences. A third media device may eliminate some firmware controlled power sequences entirely. Thus, technology described herein may achieve greater flexibility while still realizing the low power and short latency benefits provided by hardware power controllers. Indeed, the technology described herein may lead to fewer ASIC spins, shorter development time and improved operation of storage systems.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a media device;
   a hardware power controller;
   a plurality of input registers communicatively coupled to the hardware power controller;
   a plurality of output registers communicatively coupled to the hardware power controller and the media device; and
   a processor communicatively coupled to the plurality of input registers and the plurality of output registers, the processor including configurable logic to:
   identify a control policy change with respect to the hardware power controller to selectively override a control policy of the hardware power controller,
   detect input signal information in one or more of the plurality of input registers, wherein the input signal information is to correspond to power management of the media device, and
   conduct a modification of one or more values in the plurality of output registers based on the control policy change and the input signal information in the one or more of the plurality of input registers, wherein the one or more values are to trigger a transition of the media device to a power state.

2. The system of claim 1, further including:
   an event mask communicatively coupled to the plurality of input registers, wherein the configurable logic is to set one or more trigger conditions in the event mask;
   a plurality of input activity registers communicatively coupled to the event mask; and
   a gate communicatively coupled to the plurality of input activity registers and the processor, wherein the gate is to send an interrupt to the processor in response to activation of at least one of the one or more trigger conditions and the modification is to be conducted in response to the interrupt.

3. The system of claim 2, wherein the configurable logic is to modify at least one of the one or more trigger conditions in response to a power state change in the media device associated with the hardware power controller.

4. The system of claim 2, wherein the configurable logic is to clear, in response to the interrupt, one or more of the input activity registers via a write operation.

5. The system of claim 1, further including a memory mapped processor interface, wherein the modification is to be conducted via the memory mapped processor interface.

6. The system of claim 1, further including an arbitrator positioned within the hardware power controller, wherein the modification is to be conducted via the arbitrator.

7. An apparatus comprising:
a plurality of input registers communicatively coupled to a hardware power controller;
a plurality of output registers communicatively coupled to the hardware power controller; and
a processor communicatively coupled to the plurality of input registers and the plurality of output registers, the processor including configurable logic to:
identify a control policy change with respect to the hardware power controller to selectively override a control policy of the hardware power controller,
detect input signal information in one or more of the plurality of input registers, wherein the input signal information is to correspond to power management of a media device, and
conduct a modification of one or more values in the plurality of output registers based on the control policy change and the input signal information in the one or more of the plurality of input registers, wherein the one or more values are to trigger a transition of the media device to a power state.

8. The apparatus of claim 7, further including:
an event mask communicatively coupled to the plurality of input registers, wherein the configurable logic is to set one or more trigger conditions in the event mask;
a plurality of input activity registers communicatively coupled to the event mask; and
a gate communicatively coupled to the plurality of input activity registers and the processor, wherein the gate is to send an interrupt to the processor in response to activation of at least one of the one or more trigger conditions and the modification is to be conducted in response to the interrupt.

9. The apparatus of claim 8, wherein the configurable logic is to modify at least one of the one or more trigger conditions in response to a power state change in the media device.

10. The apparatus of claim 8, wherein the configurable logic is to clear, in response to the interrupt, one or more of the input activity registers via a write operation.

11. The apparatus of claim 7, further including a memory mapped processor interface, wherein the modification is to be conducted via the memory mapped processor interface.

12. The apparatus of claim 7, further including an arbitrator positioned within the hardware power controller, wherein the modification is to be conducted via the arbitrator.

13. A method comprising:
identifying a control policy change with respect to a hardware power controller to selectively override a control policy of the hardware power controller;
detecting input signal information in one or more of a plurality of input registers communicatively coupled to the hardware power controller, wherein the input signal information is to correspond to power management of a media device; and
conducting, based on the control policy change and the input signal information in the one or more of the plurality of input registers, a modification of one or more values in a plurality of output registers communicatively coupled to the hardware power controller, wherein the one or more values are to trigger a transition of the media device to a power state.

14. The method of claim 13, further including setting one or more trigger conditions in an event mask communicatively coupled to the plurality of input registers and a plurality of input activity registers, wherein the modification is conducted in response to an interrupt from a gate communicatively coupled to the plurality of input activity registers.

15. The method of claim 14, further including modifying at least one of the one or more trigger conditions in response to a power state change in the media device.

16. The method of claim 14, further including clearing, in response to the interrupt, one or more of the input activity registers via a write operation.

17. The method of claim 13, wherein the modification is conducted via a memory mapped processor interface.

18. The method of claim 13, wherein the modification is conducted via an arbitrator positioned within the hardware power controller.

19. At least one non-transitory computer readable storage medium comprising a set of instructions, which when executed by a computing system, cause the computing system to:
identify a control policy change with respect to a hardware power controller to selectively override a control policy of the hardware power controller;
detect input signal information in one or more of a plurality of input registers communicatively coupled to the hardware power controller, wherein the input signal information is to correspond to power management of a media device; and
conduct, based on the control policy change and the input signal information in the one or more of the plurality of input registers, a modification of one or more values in a plurality of output registers communicatively coupled to the hardware power controller, wherein the one or more values are to trigger a transition of the media device to a power state.

20. The at least one non-transitory computer readable storage medium of claim 19, wherein the instructions, when executed, cause the computing system to set one or more trigger conditions in an event mask communicatively coupled to the plurality of input registers and a plurality of input activity registers, and wherein the modification is to be conducted in response to an interrupt from a gate communicatively coupled to the plurality of input activity registers.

21. The at least one non-transitory computer readable storage medium of claim 20, wherein the instructions, when executed, cause the computing system to modify at least one of the one or more trigger conditions in response to a power state change in the media device.

22. The at least one non-transitory computer readable storage medium of claim 20, wherein the instructions, when executed, cause the computing system to clear, in response to the interrupt, one or more of the input activity registers via a write operation.

23. The at least one non-transitory computer readable storage medium of claim 19, wherein the modification is to be conducted via a memory mapped processor interface.

24. The at least one non-transitory computer readable storage medium of claim 19, wherein the modification it to be conducted via an arbitrator positioned within the hardware power controller.

* * * * *